United States Patent
Huang et al.

(10) Patent No.: US 10,372,252 B2
(45) Date of Patent: Aug. 6, 2019

(54) FORCE TOUCH DISPLAY DEVICE

(71) Applicant: Wuhan China Star Optoelectronics Technology Co., Ltd., Wuhan (CN)

(72) Inventors: Yaoli Huang, Wuhan (CN); Hongsen Zhang, Wuhan (CN); Xinglong He, Wuhan (CN)

(73) Assignee: WUHAN CHINA STAR OPTOELECTRONICS TECHNOLOGY CO., LTD., Wuhan, Hubei (CN)

(*) Notice: Subject to any disclaimer, the term of this patent is extended or adjusted under 35 U.S.C. 154(b) by 205 days.

(21) Appl. No.: 15/122,408

(22) PCT Filed: Jun. 27, 2016

(86) PCT No.: PCT/CN2016/087322
§ 371 (c)(1),
(2) Date: Aug. 30, 2016

(87) PCT Pub. No.: WO2017/201799
PCT Pub. Date: Nov. 30, 2017

(65) Prior Publication Data
US 2018/0150171 A1     May 31, 2018

(30) Foreign Application Priority Data
May 26, 2016 (CN) .......................... 2016 1 0357685

(51) Int. Cl.
G06F 3/041     (2006.01)
G06F 3/044     (2006.01)
G02F 1/1333    (2006.01)

(52) U.S. Cl.
CPC ...... *G06F 3/0414* (2013.01); *G02F 1/133308* (2013.01); *G06F 3/041* (2013.01);
(Continued)

(58) Field of Classification Search
CPC ................... G06F 3/0414; G06F 3/044; G06F 2203/04107; G06F 3/041; G02F 1/133308;
(Continued)

(56) References Cited

U.S. PATENT DOCUMENTS

2011/0227872 A1* 9/2011 Huska ................... G06F 3/016
345/174

FOREIGN PATENT DOCUMENTS

CN     105138183 A   * 12/2015
CN     105138183 A   * 12/2015
(Continued)

*Primary Examiner* — Brent D Castiaux
(74) *Attorney, Agent, or Firm* — Leong C. Lei

(57) ABSTRACT

The present invention provides a force touch display device, including a liquid crystal display (11), a backlight module (12), a backlight module bottom frame (121), a shield layer (2), a pressure sensor (13) and a middle frame (14). With the shield layer (2) providing a function of shielding an electromagnetic noise signal being used inside the display device, the interference applied on the pressure sense result of the pressure sensor by the electromagnetic noise signal inside the force touch display device is effectively reduced, and thus the force touch sensitivity of the force touch display device is improved.

3 Claims, 7 Drawing Sheets

(52) U.S. Cl.
CPC .......... *G06F 3/044* (2013.01); *G02F 1/13338* (2013.01); *G02F 2001/133314* (2013.01); *G02F 2001/133317* (2013.01); *G02F 2001/133334* (2013.01); *G06F 2203/04107* (2013.01)

(58) Field of Classification Search
CPC ..... G02F 1/13338; G02F 2001/133334; G02F 2001/133317; G02F 2001/133314
See application file for complete search history.

(56) References Cited

FOREIGN PATENT DOCUMENTS

| | | | |
|---|---|---|---|
| CN | 105511670 A | * | 4/2016 |
| CN | 105511670 A | * | 4/2016 |

* cited by examiner

FORCE TOUCH DISPLAY DEVICE

FIELD OF THE INVENTION

The present invention relates to a touch display technology field, and more particularly to a force touch display device.

BACKGROUND OF THE INVENTION

Smart phone is speedy developed and is basically replacing traditional non-smart phone, the screen size of cell phone is getting larger, the operation mode is also transferred from the traditional push bottom operation mode to the touching operation mode, then the rapidly development of forced touch technology is followed.

Force touch technology is major based on the deformation produced from user's finger pressing the surface of the cell phone screen, and utilizing the force sensor to sense the changes of the pressure, thus to realize the force touch; according to different principle of pressure sensing, force touch technology can be classified into three categories: Piezoelectric type, Pressure resistance type, Capacitance type; pressure resistance type touch technology is simple designed and lowest cost, but pressure resistance type touch technology is restricted by physical limitation, such as low transmittance and lots wired large detecting area caused the loading of the cell phone processor, and pressure resistance type touch technology requires keeping powered status, increases cell phone power consumption, and is easily aged itself then affected the usage lifetime, thus is being phased out; piezoelectric type technology utilize voltage driven to complete touch control, the driven method is similar to the driven method of the liquid crystal display, but also possessed disadvantage of the pressure resistance touch technology, the manufacture process in the cell phone field is not mature enough, and is not widely used.

Capacitance type force touch technology is widely used because of the mature process, high yield, and lower cost; the major implement method of the capacitance type force touch technology is tightly attaching pressure sensor on the middle frame of cell phone or on the backside of the Liquid Crystal display Module (LCM) of the cell phone, as shown in FIG. 1A-1C, according to the different attaching position of the pressure sensor 130, there are three major types of attachment: attached to the middle frame 140 of the cell phone (as shown in FIG. 1B), attached to the bottom surface of the backlight (BL) module bottom frame 1210 of (as shown in FIG. 1A), or attached to the top surface of the backlight module bottom frame 1210 (as shown in FIG. 1C), although the above three methods can achieve the result of capacitance type force touch, but there are other variety electromagnetic signal inside the cell phone, most of the electric signal is a electromagnetic noise signal to the pressure sensor, the sense result of the pressure sensor is then interfered, the force touch sensitivity is reduced, a affected the user experience result.

SUMMARY OF THE INVENTION

An object of the invention is to provide a force touch display device, wherein the pressure sense result will not interfered by electromagnetic noise signal, and possess a high force touch sensitivity.

For realizing the aforesaid objective, the present invention provides a force touch display device, comprising a liquid crystal display, a backlight module located under the liquid crystal display, a backlight module bottom frame located under the backlight module, a shield layer located under the backlight module bottom frame, a pressure sensor located under the shield layer, and a middle frame located under the pressure sensor.

The shield layer is a conductive material.

A gap is comprised between the pressure sensor and the middle frame, and then a capacitor is formed between the pressure sensor and the middle frame.

The pressure sensor is sensing a pressure applied on the force touch display device through a capacitance change between the pressure sensor and the middle frame, and the shield layer is used to screen an electromagnetic noise signal from the liquid crystal display so as to prevent pressure sensing conducted by the pressure sensor from being interfered with by the electromagnetic noise signal.

The shield layer is an entire sheet of conductive film or a conductive film with a plurality of hollow pattern.

A material of the shield layer is metal.

A material of the backlight module bottom frame is metal or non-metal.

A material of the middle frame is metal.

The present invention also provides a force touch display device, wherein, comprising a liquid crystal display, a back light module located under the liquid crystal display, a shield layer located under the backlight module, a backlight module bottom frame located under the shield layer, a pressure sensor located under the bottom frame, and a middle frame located under the pressure sensor.

A material of the shield layer is metal.

A gap is comprised between the pressure sensor and the backlight module bottom frame, and a capacitor is formed between the pressure sensor and the backlight module bottom frame.

The pressure sensor is sensing a pressure applied on the force touch display device through a capacitance change between the pressure sensor and the backlight module bottom frame, and the shield layer is used to screen an electromagnetic noise signal from the liquid crystal display so as to prevent pressure sensing conducted by the pressure sensor from being interfered with by the electromagnetic noise signal.

The shield layer is an entire sheet of conductive film or a conductive film with a plurality of hollow pattern.

A material of the shield layer is metal.

A material of the backlight module bottom frame is metal.

A material of the middle frame is metal.

The present invention also provides another force touch display device, comprising a liquid crystal display, a backlight module located under the liquid crystal display, a pressure sensor located under the backlight module, a shield layer located under the pressure sensor, a backlight module bottom frame located under the shield layer, and a middle frame located under the backlight module bottom frame.

The shield layer is a conductive material.

A gap is comprised between the pressure sensor and the backlight module, and then a capacitor is formed between the pressure sensor and the backlight module.

The pressure sensor is sensing a pressure applied on the force touch display through a capacitance changes between the pressure sensor and the liquid crystal display, and the shield layer is used to screen the electromagnetic noise signal so as to prevent pressure sensing conducted by the pressure sensor from being interfered with by the electromagnetic noise signal, and providing a function of isolating the middle frame.

The shield layer is an entire sheet of conductive film or a conductive film with a plurality of hollow pattern.

A material of the shield layer is metal.

A material of the backlight module bottom frame is metal or non-metal.

A material of the middle frame is metal.

The benefits of the present invention are: the present invention provides a force touch display device, comprising a liquid crystal display, a backlight module, a backlight module bottom frame, a shield layer, a pressure sensor and a middle frame, a shield layer with a function of screening electromagnetic noise signal is used inside the force touch display device, so that compared to current force touch display device, the interference applied on the pressure sensing result of the pressure sensor by the electromagnetic noise signal inside the force touch display device is effectively reduced, and thus the force touch sensitivity of the force touch display device is improved.

BRIEF DESCRIPTION OF THE DRAWINGS

In order to further understand the features and technical contents of the present invention, please reference below for a detailed description of the invention and drawings, drawings provide for reference and explanation only, however are not used to limit the invention.

In drawings.

DETAILED DESCRIPTION OF PREFERRED EMBODIMENTS

For further elaborating the technical solution in present invention and the effect, the present invention will be further described in detail with specific embodiment and attached drawings.

Figure 1A:
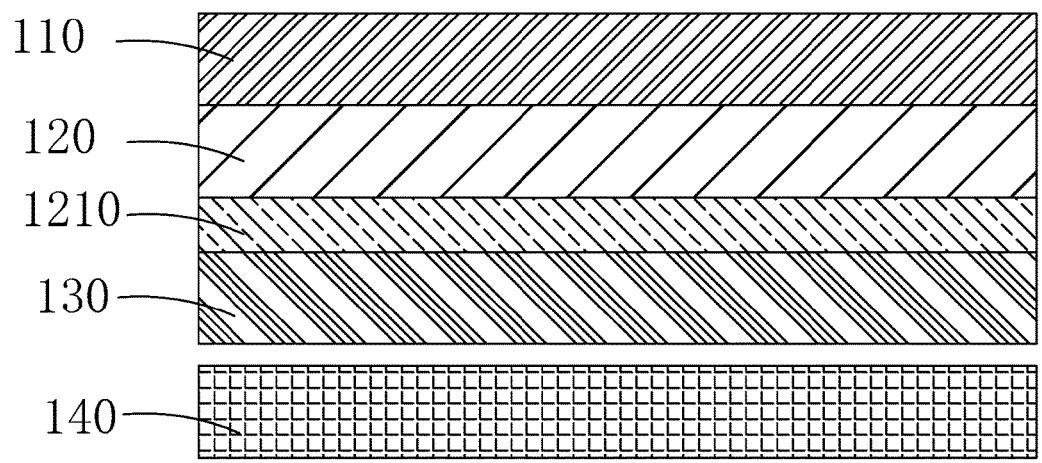
FIG. 1A is a schematic diagram of currently first type of force touch display device.
Figure 1B:
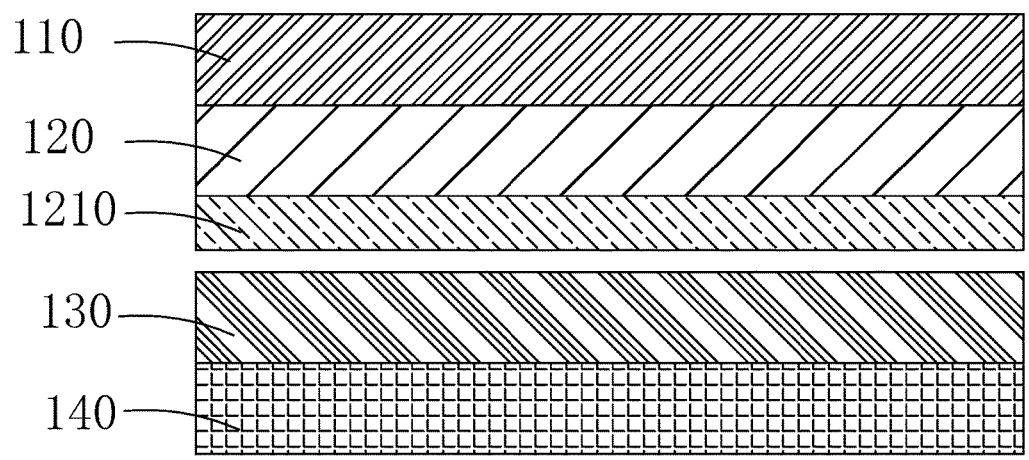
FIG. 1B is a schematic diagram of currently second type of force touch display device.
Figure 1C:
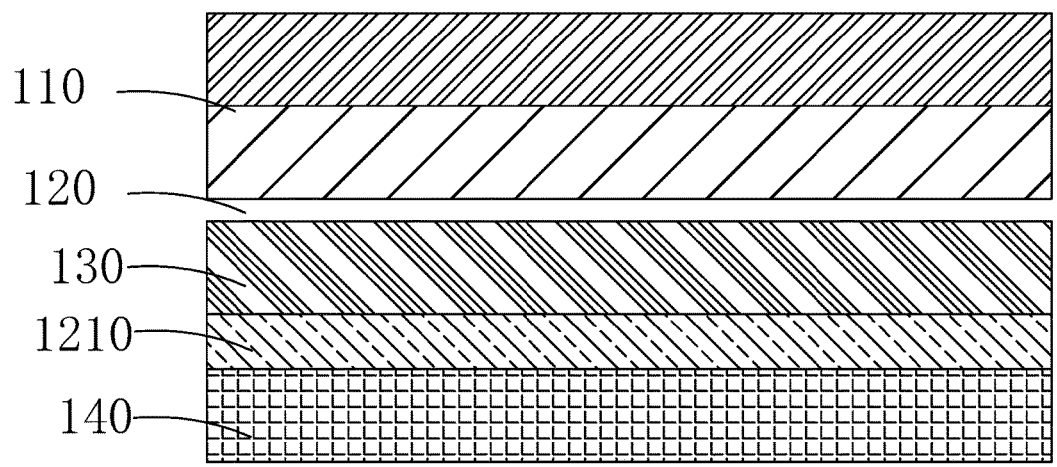
FIG. 1C is a schematic diagram of currently third type of force touch display device.
Figure 2:
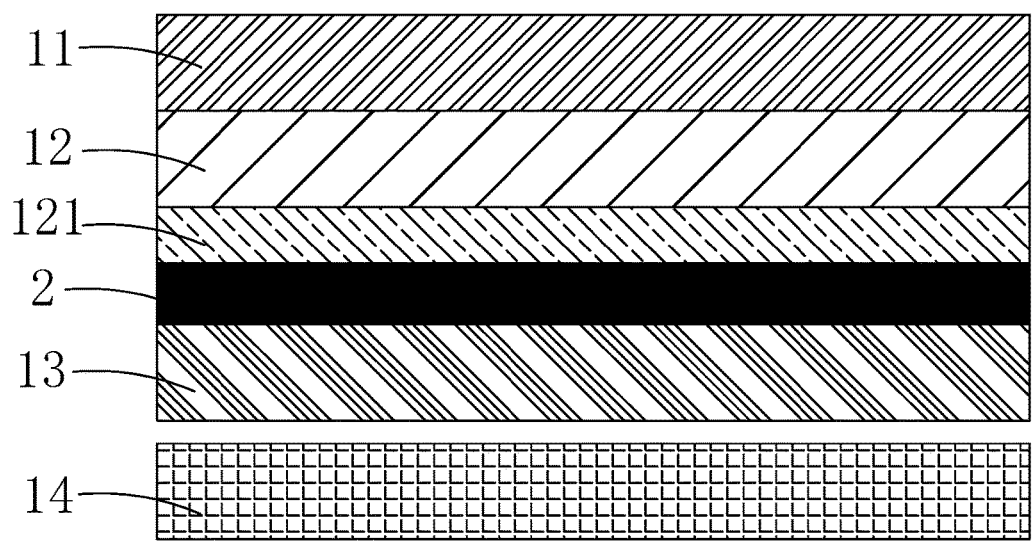
FIG. 2 is a schematic diagram of a first embodiment of the force touch device of the present invention.

Please refer to FIG. 2, the present invention provides one force touch device, comprising a liquid crystal display 11, a backlight module 12 located under the liquid crystal display 11, a backlight module bottom frame 121 located under the backlight module 12, a shield layer 2 located under the backlight module bottom frame 121, a pressure sensor 13 located under the shield layer 2, and a middle frame 14 located under the pressure sensor 13.

The shield layer 2 is a conductive material.

A gap is comprised between the pressure sensor 13 and the middle frame 14, then a capacitor is formed between the pressure sensor 13 and the middle frame 14.

The pressure sensor 13 is sensing a pressure applied on the force touch display device through a capacitance changes between the pressure sensor 13 and the middle frame 14.

Specifically, the liquid crystal display 11 and the backlight module 12 is deformed by applying an external force on the force touch display at one side of liquid crystal display 11, the pressure sensor 13 deformed the same as the liquid crystal display 11 and the backlight module 12 because the pressure sensor 13 is attached under the backlight module 12, the capacitance between the pressure sensor 13 and the middle frame 14 is changed by changing of the gap width between the pressure sensor 13 and the middle frame 14, then the pressure applied on the force touch display is then obtained from capacitance changes that is sensed by the pressure sensor 13, thus to realize function of force touch function.

Explanations required, the shield layer 2 is a conductive material and possessing a function of screening electromagnetic noise signal, the shield layer 2 is located between a bottom surface of the backlight module bottom frame 121 and the pressure sensor 13, is used to screen an electromagnetic noise signal from the liquid crystal display 11, preventing the sensing result of the pressure sensor 13 from being interfered with by the electromagnetic noise signal, then effectively increasing a touch sensitivity of the force touch device.

Preferably, a material of the shield layer 2 is metal.

Figure 5A:
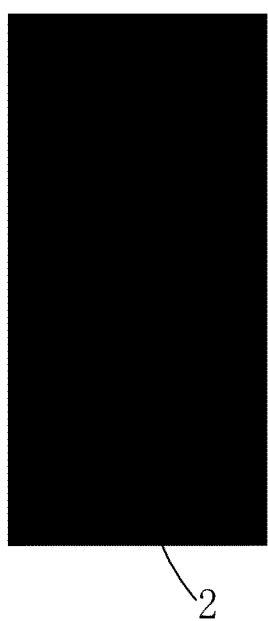
FIG. 5A is a diagram of one pattern of shield layer in the force touch device of the present invention.
Figure 5B:
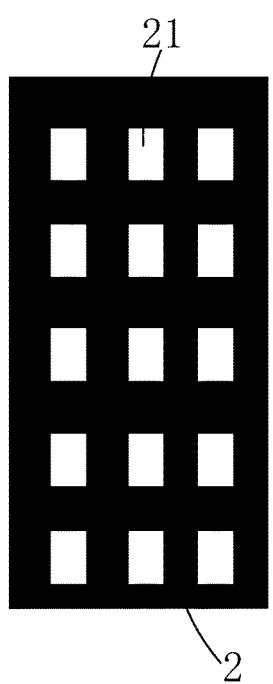
FIG. 5B is a diagram of another pattern of shield layer in the force touch device of the present invention.
Figure 5C:
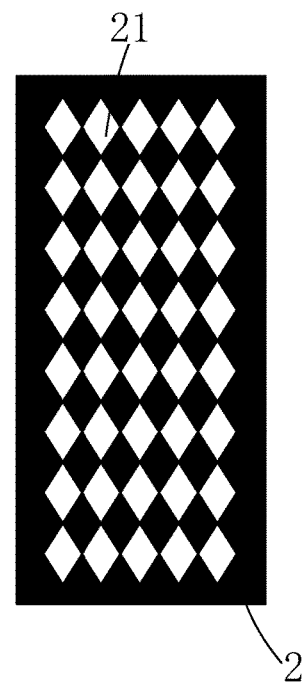
FIG. 5C is a diagram of the other pattern of shield layer in the force touch device of the present invention.

Further, please refer to FIG. 5A to FIG. 5C, the shield layer 2 is an entire sheet of a conductive film (shown in FIG. 5A) or is a conductive film with a plurality of hollow pattern 21 (shown in FIG. 5B-5C). Compared to an entire sheet of a conductive film, the conductive film with the plurality of hollow pattern 21 is realizing same effect of screening electromagnetic noise signal and is saving raw material and cost at the same time.

Further, a shape of the hollow pattern 21 is a rectangle, a rhombus or a circular pattern. Preferably, wherein the conductive film with the plurality of hollow patterns 21, the plurality of hollow patterns is arranged in a matrix, thus the conductive film with plurality of hollow patterns 21 is mesh-like.

Specifically, a material of the backlight module bottom frame 121 is metal or non-metal.

Particularly, when a material of backlight module bottom frame 121 is non-metal, the shield layer 2 is screening the electromagnetic noise signal from the liquid crystal display 11; when the material of backlight module bottom frame 121 is metal, the backlight module bottom frame 121 is a shield layer to screen the electromagnetic noise signal from the liquid crystal display 11, or joint with attached shield layer 2 to screen the electromagnetic noise signal from the liquid crystal display 11.

Further, in case a material of the backlight module bottom frame 121 is metal, iron is preferred for the metal.

Specifically, a material of the middle frame 14 is metal.

Specifically, the middle frame 14 is providing a support and a protection to the components above, the liquid crystal display 11 the backlight module 12, the backlight module bottom frame 121, the shield layer 2, and the pressure sensor 13.

The aforesaid force touch display device is sensing the pressure applied on the force touch display device through the capacitance changes between the pressure sensor 13 and the middle frame 14, the shield layer 2 with a function of screening electromagnetic noise signal is located between the pressure sensor 13 and the backlight module bottom frame 121, so that compared to the current force touch display device, the interference applied on the pressure sensing result of the pressure sensor by the electromagnetic noise signal inside the force touch display device is effectively reduced, and thus the force touch sensitivity of the force touch display device is improved.

Figure 3:
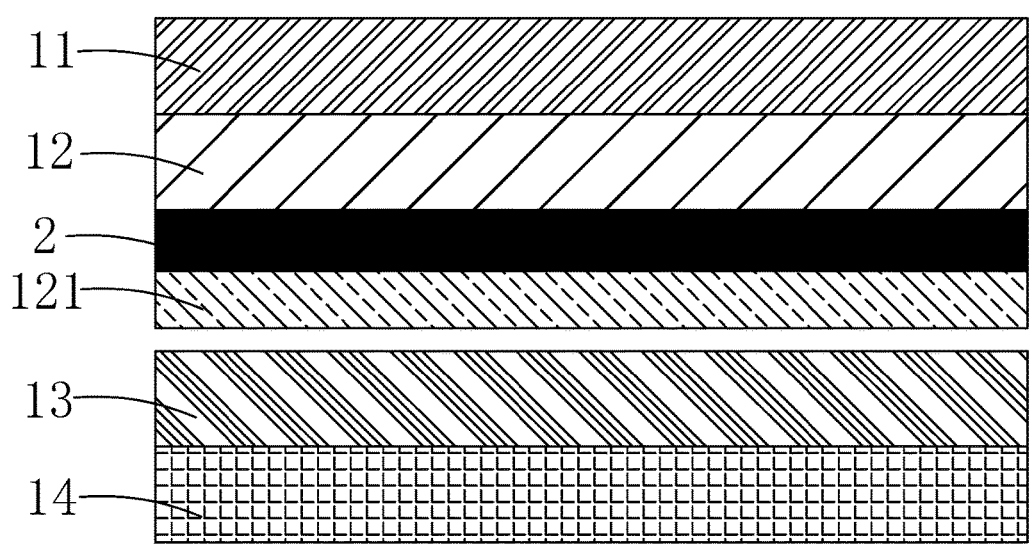
FIG. 3 is a schematic diagram of a second embodiment of the force touch device of the present invention.

Please refer to FIG. 3, the present invention also provides another force touch display device, comprising a liquid crystal display 11, a backlight module 12 located under the liquid crystal display 11, a shield layer 2 located under the backlight module 12, a backlight module bottom frame 121 located under the shield layer 2, a pressure sensor 13 located under the backlight module bottom frame 121, a middle frame 14 located under the pressure sensor 13.

The shield layer 2 is a conductive material.

A gap is comprised between the pressure sensor 13 and the backlight module bottom frame 121, then a capacitor is formed between the pressure sensor 13 and the backlight module bottom frame 121.

The pressure sensor 13 is sensing a pressure applied on the force touch display device through a capacitance changes between the pressure sensor 13 and the backlight module bottom frame 121.

Specifically, when an external force is applied on the force touch display device at one side of liquid crystal display 11, the liquid crystal display 11 is deformed, then the backlight module 12 and the backlight module bottom frame are deformed consequently, the pressure sensor 13 is not deformed because there is a gap between the pressure sensor and the backlight module bottom frame 121, therefore the gap width between the pressure sensor 13 and the backlight module bottom frame 121 is changed, then the capacitance between the pressure sensor 13 and the backlight module bottom frame 121 is changed, the changed capacitance is sensed by the pressure sensor 13 then the pressure applied on the force touch display device is obtained, thus the fore touch function is realized.

Explanation is required, the shield layer 2 is a conductive material and possess a function of screening a electromagnetic noise signal, the shield layer 2 is located between the backlight module bottom frame 121 and the backlight module 12, that can screen the electromagnetic noise signal from the liquid crystal display so as to prevent pressure sensing result of the pressure sensor 13 from being interfered with by the electromagnetic noise signal, and the force touch sensitivity of the force touch display device is then effectively improved.

Preferably, a material of the shield layer 2 is metal.

Further, please refer to FIG. 5A to FIG. 5C, the shield layer 2 is an entire sheet of a conductive film (shown in FIG. 5A) or is a conductive film with a plurality of hollow pattern 21 (shown in FIG. 5B-5C). Compared to an entire sheet of a conductive film, the conductive film with the plurality of hollow pattern 21 is realizing same effect of screening electromagnetic noise signal and is saving raw material and cost at the same time.

Further, a shape of the hollow pattern 21 is a rectangle, a rhombus or a circular pattern. Preferably, wherein the conductive film with the plurality of hollow patterns 21, the plurality of hollow patterns is arranged in a matrix, thus the conductive film with plurality of hollow patterns 21 is mesh-like. Specifically, a material of the backlight module bottom frame 121 is metal.

Preferably, a material of the backlight module bottom frame 121 is metal, an iron is preferred.

Specially, wherein the aforesaid force touch display device, the backlight module bottom frame 121 and the shield layer 2 are screening the electromagnetic noise signal from the liquid crystal display 11 together, enhancing the screening effect, improve the force touch sensitivity of the force touch display device.

Specifically, a material of the middle frame 14 is metal.

Specifically, the middle frame 14 is providing a support and a protection to the components above, the liquid crystal display 11 the backlight module 12, the shield layer 2, the backlight module bottom frame 121, and the pressure sensor 13.

Wherein the aforesaid force touch display device is sensing a pressure applied on the force touch display device through a capacitance changes between the pressure sensor 13 and the backlight module bottom frame 121, the shield layer 2 with a function of screening electromagnetic noise signal is located between the backlight module 12 and the backlight module bottom frame 121, so that compared to the current force touch display device, interference of pressure sensing result of the pressure sensor from the electromagnetic noise signal inside the force touch display device is reduced, and the force touch sensitivity of the force touch display device is then effectively improved.

Figure 4:
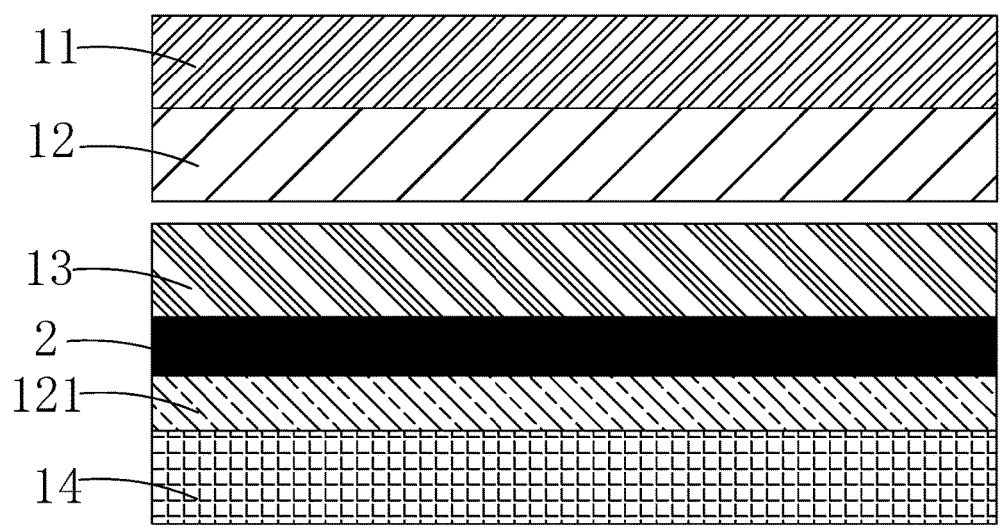
FIG. 4 is a schematic diagram of a third embodiment of the force touch device of the present invention.

Please refer to FIG. 4, the present invention provides the other force touch display device, comprising a liquid crystal display 11, a backlight module 12 located under the liquid crystal display 11, a pressure sensor 13 located under the backlight module 12, a shield layer 2 located under the pressure sensor 13, a backlight module bottom frame 121 located under the shield layer 2, and a middle frame 14 located under the backlight module bottom frame 121.

The shield layer 2 is a conductive material.

A gap is comprised between the pressure sensor 13 and the backlight module 12, thus a capacitor is formed between the pressure sensor 13 and the liquid crystal display 11.

The pressure sensor 13 is sensing a pressure applied in the force touch display device through the capacitor changes between the pressure sensor 13 and the liquid crystal display 11.

Specifically, the liquid crystal display 11 and the backlight module 12 deformed when there is an external force applied on the force touch display device at one side of the liquid crystal display 11, the gap width between the pressure sensor 13 and the backlight module 12 is changed, then a capacitance between the pressure sensor 13 and the liquid crystal display 11 is changed, the pressure sensor 13 is sensing the changed capacitance to obtain the pressure applied on the force touch display device, to realize the force touch function.

Explanation required, the shield layer 2 is a conductive material and possess a function of screening a electromagnetic noise signal, the shield layer 2 is located between the backlight module bottom frame 121 ad the pressure sensor 13 and is used to screen the electromagnetic noise signal, preventing a pressure sense result of the pressure sensor 13 from interfering by the electromagnetic noise signal, a force touch sensitivity of the force touch display device is effectively increased; wherein a capacitance between the middle frame 14 and the pressure sensor 13 will not changed because the middle frame 14 is isolated by the shield layer 2, thus the fore touch sensitivity of the force touch display device is further improved.

Preferably, a material of the shield layer 2 is metal.

Further, please refer to FIG. 5A to FIG. 5C, the shield layer 2 is an entire sheet of a conductive film (shown in FIG. 5A) or is a conductive film with a plurality of hollow pattern 21 (shown in FIG. 5B-5C). Compared to an entire sheet of a conductive film, the conductive film with the plurality of hollow pattern 21 is realizing same effect of screening electromagnetic noise signal and is saving raw material and cost at the same time.

Further, a shape of the hollow pattern 21 is a rectangle, a rhombus or a circular pattern. Preferably, wherein the conductive film with the plurality of hollow patterns 21, the plurality of hollow patterns is arranged in a matrix, thus the conductive film with plurality of hollow patterns 21 is mesh-like.

Specifically, a material of the backlight module bottom frame 121 is a metal or a non-metal.

Specially, when the material of the backlight module bottom frame 121 is non-metal, the shield layer 2 completes the function of screening the electromagnetic noise signal and isolation for middle frame 14; when the material of the backlight module bottom frame 121 is metal, the backlight module bottom frame 121 is a shield layer to complete a function of screening the electromagnetic noise material, or joint with attached shield layer 2 to complete the function of screening the electromagnetic noise signal.

Further, when the material of the backlight module bottom frame 121 is metal, an iron is preferred for the material of the backlight module bottom frame 121.

Specifically, a material of the middle frame 14 is metal.

Specifically, the middle frame 14 is providing a support and a protection for the components above, the liquid crystal display 11, the backlight module 12, the pressure sensor 13, the shield layer 2, and the backlight module bottom frame 121.

Wherein the aforesaid force touch display device is sensing a pressure applied on the force touch display device through a capacitance changes between the pressure sensor 13 and the backlight module 12, a shield layer 2 possessing a function of screening an electromagnetic noise signal is located between the pressure sensor 13 and the backlight module bottom frame 121, so that compared to the current force display device, interference with the pressure sensing result of the pressure sensor by an electromagnetic noise signal is reduced, and the force touch sensitivity of force touch display device is improved.

In conclusion, the present invention provides a force touch display device, comprising a liquid crystal display, a backlight module, a backlight module bottom frame, a shield layer, a pressure sensor, a middle frame, a shield layer possessing a function of screening electromagnetic noise signal is used inside the force touch display device, so that compared to the current force touch display device, interference with the pressure sensing result of pressure sensor by the electromagnetic noise signal in the force touch device is reduced, and then the force touch sensitivity of the force touch display device is increased.

Above are only specific embodiments of present invention, the scope of the present invention is not limited to this, and to any persons who are skilled in the art, change or replacement which is easily derived should be covered by the protected scope of the invention. Thus, the protected scope of invention should go by the subject claims.

What is claimed is:

1. A force touch display device, comprising a liquid crystal display, a backlight module located under the liquid crystal display, a shield layer located under the backlight module, a backlight module bottom frame located under the shield layer, a pressure sensor located under the backlight module bottom frame, and a middle frame located under the pressure sensor;

wherein the shield layer is a conductive material;

a gap is comprised between the pressure sensor and the backlight module bottom frame so as to form a capacitor between the pressure sensor and the backlight module bottom frame; and the pressure sensor is sensing a pressure applied on the force touch display device through a capacitance change between the pressure sensor and the backlight module bottom frame, and the shield layer is used to screen an electromagnetic noise signal from the liquid crystal display so as to prevent pressure sensing conducted by the pressure sensor from being interfered with by the electromagnetic noise signal;

wherein the shield layer and the pressure sensor are arranged on opposite sides of the gap so that the shield layer and the pressure sensor are spaced from each other by the gap and wherein the pressure sensor is arranged on the middle frame and the shield layer is arranged on the backlight module bottom frame and is deformable in combination with the backlight module bottom frame in a direction toward the gap to shorten the distance between the pressure sensor and the backlight module bottom frame and cause the capacitance change between the pressure sensor and the backlight module bottom frame.

2. The force touch display device according to claim 1, wherein the shield layer is an entire sheet of conductive film or is a conductive film with a plurality of hollow pattern.

3. The force touch display device according to claim 1, wherein a material of the shield layer is a metal;

a material of the backlight module bottom frame is metal; and a material of the middle frame is metal.

* * * * *